US010765068B2

(12) United States Patent
Kraus et al.

(10) Patent No.: US 10,765,068 B2
(45) Date of Patent: *Sep. 8, 2020

(54) BALE WRAP MECHANISM

(71) Applicant: Deere & Company, Moline, IL (US)

(72) Inventors: Timothy J. Kraus, Blakesburg, IA (US); Henry D. Anstey, Ottumwa, IA (US); Uri Blich, Kibbutz Mishmar Haemek (IL)

(73) Assignee: DEERE & COMPANY, Moline, IL (US)

( * ) Notice: Subject to any disclaimer, the term of this patent is extended or adjusted under 35 U.S.C. 154(b) by 188 days.

This patent is subject to a terminal disclaimer.

(21) Appl. No.: 15/799,962

(22) Filed: Oct. 31, 2017

(65) Prior Publication Data

US 2018/0249636 A1 Sep. 6, 2018

Related U.S. Application Data

(60) Provisional application No. 62/466,874, filed on Mar. 3, 2017.

(51) Int. Cl.
*A01F 15/07* (2006.01)
*A01F 15/08* (2006.01)

(52) U.S. Cl.
CPC ........ *A01F 15/0715* (2013.01); *A01F 15/071* (2013.01); *A01F 15/0875* (2013.01);
(Continued)

(58) Field of Classification Search
CPC ................ A01F 15/071; A01F 15/0715; A01F 15/0875; A01F 2015/072; B65B 11/00;
(Continued)

(56) References Cited

U.S. PATENT DOCUMENTS

| 4,058,426 A | 11/1977 | Pasic et al. |
| 4,360,997 A * | 11/1982 | Smith, Jr. ............. B65B 27/125 100/255 |

(Continued)

FOREIGN PATENT DOCUMENTS

| DE | 9004354.5 U1 | 6/1990 |
| EP | 1352554 A1 | 10/2003 |
| WO | 99/22583 A1 | 5/1999 |

OTHER PUBLICATIONS

Extended European Search Report and Search Opinion for Application No. 18158373.3 dated Jun. 20, 2018 (7 pages).

*Primary Examiner* — Andrew M Tecco
*Assistant Examiner* — Nicholas E Igbokwe
(74) *Attorney, Agent, or Firm* — Michael Best & Friedrich LLP

(57) ABSTRACT

A bale wrap mechanism for use with a roll of wrap material, the bale wrap mechanism including a frame including a wrap chute formed from one or more perimeter walls, where the wrap chute defines a wrap axis extending longitudinally therethrough, and where the one or more perimeter walls at least partially define a passageway, a wrap arm coupled to the frame, the wrap arm having a mounting point movable with respect to the frame, and a shaft coupled to the mounting point and configured to support the roll of wrap material thereon, where the shaft is configured to travel along a wrap path during a wrapping process, where the wrap path surrounds the passageway, and where the wrap path is non-circular in shape.

7 Claims, 18 Drawing Sheets

(52) U.S. Cl.
CPC ... *A01F 2015/072* (2013.01); *A01F 2015/073* (2013.01); *A01F 2015/0725* (2013.01)

(58) Field of Classification Search
CPC ......... B65B 11/02; B65B 13/20; B65B 13/02; B65B 27/125
See application file for complete search history.

(56) References Cited

U.S. PATENT DOCUMENTS

| | | | |
|---|---|---|---|
| 4,387,552 A | 6/1983 | Lancaster et al. | |
| 4,641,484 A * | 2/1987 | Popelka | A01F 15/071 53/211 |
| 5,107,657 A * | 4/1992 | Diehl | B65B 11/006 53/141 |
| 5,125,210 A | 6/1992 | Lang et al. | |
| 5,170,701 A | 12/1992 | Viaud | |
| 5,423,163 A * | 6/1995 | Wendt | B65B 11/025 53/556 |
| 5,452,566 A * | 9/1995 | Benhamou | B65B 11/025 53/389.3 |
| 5,531,061 A * | 7/1996 | Peterson | A01F 15/071 53/133.8 |
| 5,564,258 A * | 10/1996 | Jones, Sr. | B65B 11/008 53/399 |
| 5,822,967 A | 10/1998 | Hood et al. | |
| 5,850,726 A | 12/1998 | Degrasse et al. | |
| 5,873,214 A | 2/1999 | Moore et al. | |
| 6,470,656 B2 | 10/2002 | Huson et al. | |
| 6,739,115 B1 | 5/2004 | Malini | |
| 6,964,147 B2 | 11/2005 | Gambetti | |
| 2002/0174628 A1 | 11/2002 | Lancaster, III et al. | |
| 2003/0070392 A1* | 4/2003 | Lacey | A01F 15/071 53/399 |
| 2003/0192416 A1 | 10/2003 | Platon et al. | |
| 2004/0177597 A1 | 9/2004 | Dougherty | |
| 2008/0229714 A1 | 9/2008 | Zitella et al. | |
| 2009/0217624 A1 | 9/2009 | Forrest | |
| 2011/0271641 A1* | 11/2011 | Hourihane | A01F 15/071 53/203 |
| 2012/0042615 A1* | 2/2012 | Roche | B65B 11/025 53/461 |
| 2012/0180430 A1 | 7/2012 | Lavoie et al. | |
| 2012/0324830 A1 | 12/2012 | Reijersen van Buuren | |
| 2014/0041339 A1* | 2/2014 | Borrelli | B65B 63/02 53/438 |
| 2014/0174036 A1 | 6/2014 | Field | |
| 2015/0047301 A1 | 2/2015 | Messersi' | |
| 2015/0232213 A1 | 8/2015 | Vaughn et al. | |
| 2015/0259087 A1* | 9/2015 | Schwartz | B65B 11/025 53/556 |
| 2015/0266605 A1 | 9/2015 | Bonta, Jr. | |
| 2016/0113206 A1* | 4/2016 | Kraus | A01F 15/0875 56/433 |
| 2016/0183474 A1* | 6/2016 | Thoreson | A01F 15/0715 53/399 |
| 2016/0272351 A1 | 9/2016 | Faehrenkaemper | |
| 2016/0318640 A1* | 11/2016 | d'Haene | B65B 27/125 |

\* cited by examiner

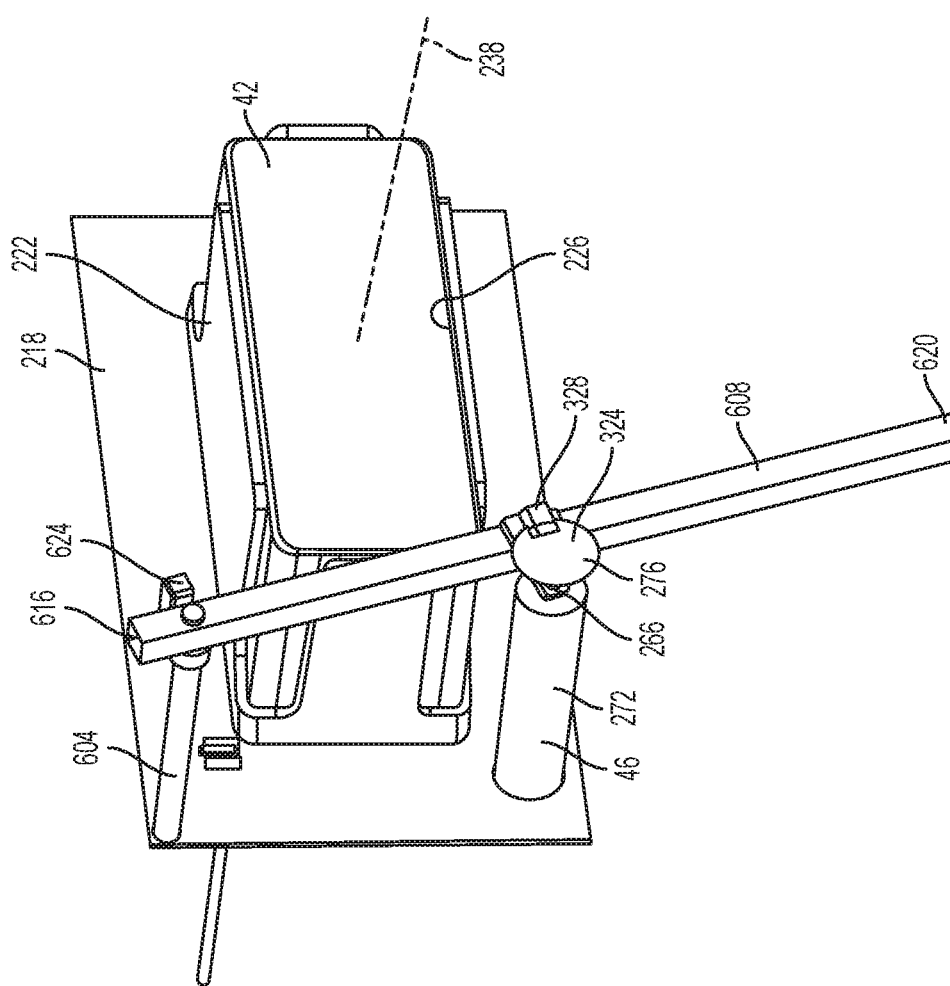

BALE WRAP MECHANISM

CROSS-REFERENCED TO RELATED APPLICATION

This patent application claims priority to U.S. Provisional Patent Application No. 62/466,874, filed Mar. 3, 2017, which is hereby incorporated by reference.

FIELD

The present disclosure relates to an agricultural baler having a wrap mechanism.

BACKGROUND

During the baling process, crop material is collected from a support surface or field and compressed into an extrusion of compressed crop material and divided into discrete bales. Once divided, the individual bales may be wrapped by a wrapping mechanism before being discharged from the baler. The wrapping helps maintain the integrity of the bales after they have left the confines of the baler itself.

SUMMARY

In one implementation, a bale wrap mechanism for use with a roll of wrap material, the bale wrap mechanism including a frame including a wrap chute formed from one or more perimeter walls, where the wrap chute defines a wrap axis extending longitudinally therethrough, and wherein the one or more perimeter walls at least partially define a passageway, a wrap arm coupled to the frame, the wrap arm having a mounting point movable with respect to the frame, and a shaft coupled to the mounting point and configured to support the roll of wrap material thereon, where the shaft is configured to travel along a wrap path during a wrapping process, where the wrap path surrounds the passageway, and wherein the wrap path is non-circular in shape.

In another implementation, a bale wrap mechanism for use with a roll of wrap material, the bale wrap mechanism including a frame including a wrap chute formed from one or more perimeter walls, where the wrap chute includes a wrap axis extending longitudinally therethrough, and where the one or more perimeter walls at least partially define a passageway, a first wrapping arm having a first end pivotably coupled to the frame and a second end opposite the first end, a slider slidably coupled to the first wrapping arm and defining a mounting point, wherein the slider is movable with respect to the first wrapping arm between the first end and the second end of the first wrapping arm, and a shaft coupled to the mounting point, where the shaft is configured to rotatably support the roll of wrap material thereon, where the shaft is configured to travel along a wrap path during a wrapping process, where the wrap path surrounds the passageway, and wherein the wrap path is non-circular in shape.

Other aspects of the disclosure will become apparent by consideration of the detailed description and accompanying drawings.

BRIEF DESCRIPTION OF THE DRAWINGS

FIGS. 8a-8d illustrate a third implementation of the wrap assembly in various positions of the wrapping process.

DETAILED DESCRIPTION

Figure 1:
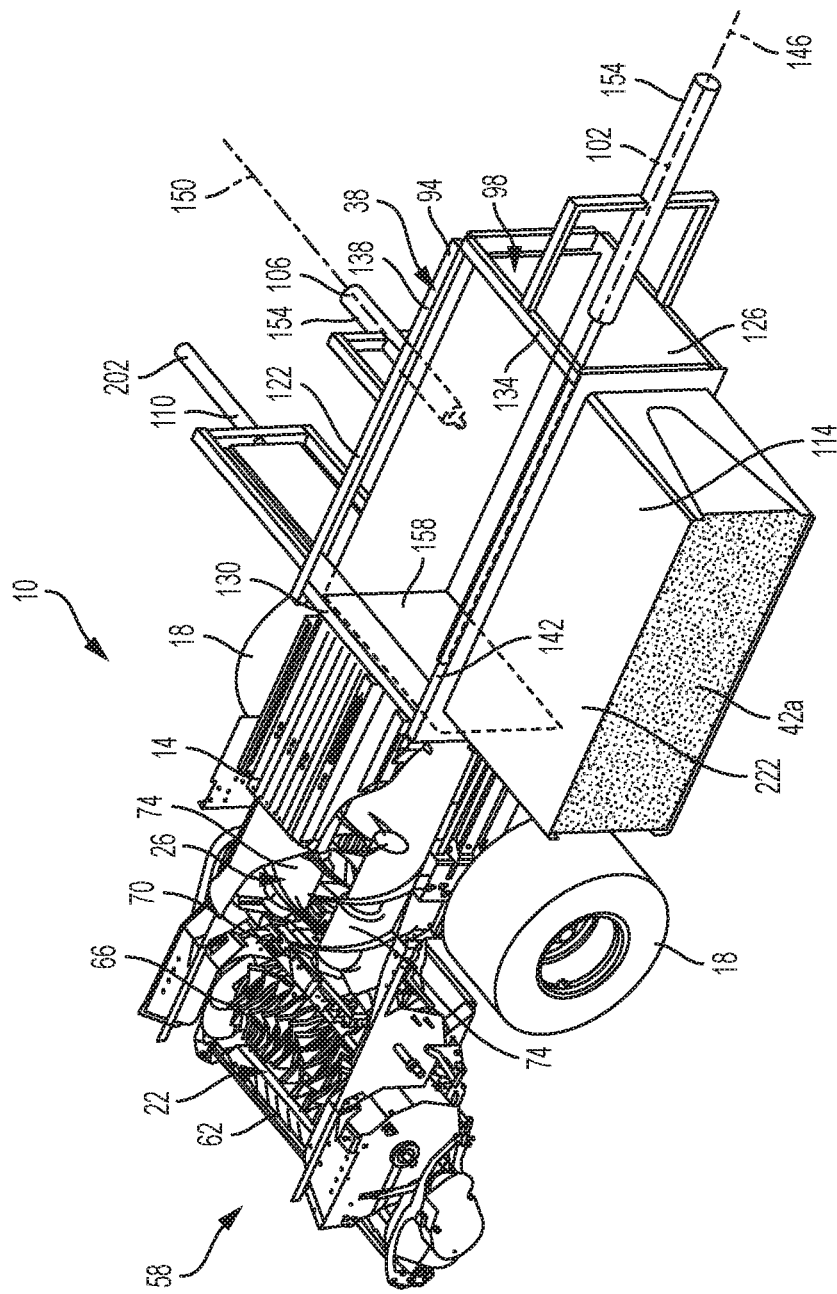
FIGS. 1-4 are a perspective view of a machine, such as a baler, having a wrap assembly in accordance with one implementation of the present disclosure.
Figure 2:
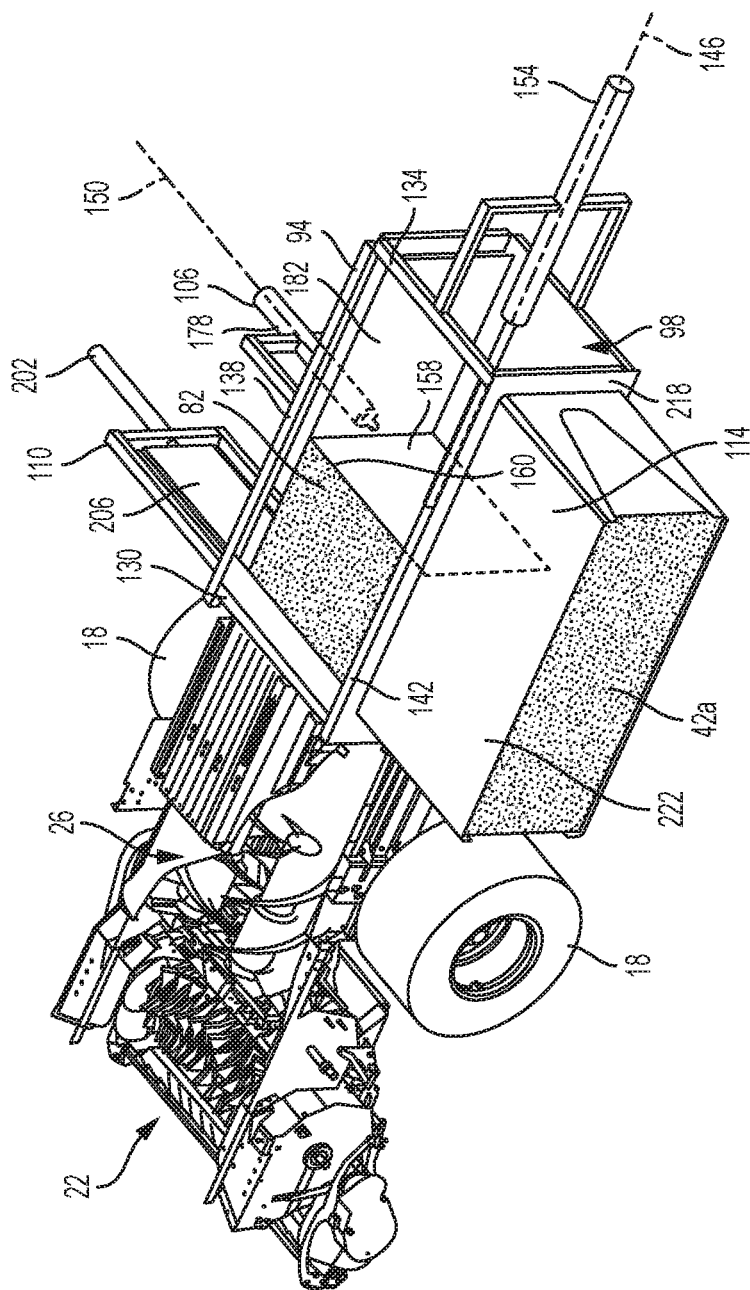

Before any implementations of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure relates to a bale wrapping mechanism and more particularly to a bale wrapping mechanism able to apply wrapping material to a finished bale under tension to maintain the density level of the bale material. In particular, forming bales at particularly high density levels (i.e., upwards of 30 lb/ft$^3$) changes the underlying crop material's rheological properties causing the stems of the crop material to become smashed and crushed to the point where the crop material has virtually no tubular structure and loses its ability to support a load. As such, the highly compressed crop material cannot rebound or expand after it has been compressed. Due to these properties, highly compressed bales must be constantly maintained in a compressed state to maintain the bale's integrity, shape, and density. The illustrated bale wrapping mechanism applies the wrap material under tension to the finished bale to maximize the bale's integrity and density. Still further, the net wrapping mechanism is configured so that the mechanism can accommodate bales of different sizes and shapes.

Referring to FIGS. 1-4, a baler 10 includes a frame 14, a set of wheels 18 mounted on the frame 14, a feed system 22 coupled to the frame 14, a compression system 26 to receive and compress crop material provided by the feed system 22, a wrap assembly 38 to wrap the finished bale 42 in wrap material 46, and a controller (not shown) to monitor and direct the baling operation. In the illustrated implementation, the baler 10 is a square baler for creating finished bales 42 of a crop, such as hay, straw, or other biomasses.

In the illustrated implementation, the frame 14 of the baler 10 includes a tow bar (not shown) extending from the frame 14 and connectable to a towing vehicle (not shown), such as an agricultural tractor or other driven vehicle. The baler 10 also includes a power takeoff shaft (not shown) connectable to the towing vehicle to transmit a rotating drive force from the towing vehicle to various components of the baler 10. In other implementations, the baler 10 may have a dedicated power supply and/or prime mover (not shown), such as an engine, motor, battery, fuel cell, etc., for driving the wheels 18 and for driving and/or powering the various components of the baler 10.

As shown in FIGS. 1-4, the feed system 22 is configured to pick up windrowed crop material 34 from a support surface 58 (e.g., from a field) and convey the crop material 34 to the compression system 26 for subsequent processing. In the illustrated implementation, the feed system 22 includes a pickup assembly 62 for collecting the crop material 34 from the support surface 58, a pre-cutter 66 to re-size the crop material 34 into smaller, more manageable pieces, and an accelerator roll 70 to direct the crop material 34 into the compression system 26.

The compression system 26 of the baler 10 includes an auger style compression system 26 utilizing one or more augers 74 which rotate with respect to the frame 14 to compress the crop material 34 received from the feed system 22. During baling operations, the augers 74 rotate producing a continuous output of highly compressed bale material in the form of an extrusion 82.

Illustrated in FIGS. 1-4, the wrap mechanism 38 of the baler 10 includes a frame 94 defining a volume 98 therein, a resistance assembly 102 in operable communication with the volume 98, an ejection assembly 106 in operable communication with the volume 98, a cutting assembly 110 positioned opposite the resistance assembly 102, a wrap chute 114 positioned opposite the ejection assembly 106, and a wrap assembly 118 coupled to the frame 94 proximate the wrap chute 114. During use, the wrap mechanism 38 is configured to receive and process the extrusion 82 of compressed bale material from the compression system 26 to create a finished bale shape 42, re-position the finished bale shape 42 within the wrap chute 114 for wrapping, apply wrapping material 46 to the outside of the bale 42, and eject the wrapped bale 42 for subsequent pickup.

Illustrated in FIGS. 1-4, the frame 94 of the wrap mechanism 38 is substantially rectangular in shape and includes a top wall 122, and a bottom wall 126 spaced a distance from the top wall 122 to at least partially define the volume 98 therebetween. Together, the top wall 122 and the bottom wall 126 also define a first side or inlet 130 through which the extrusion 82 enters the volume 98. The top wall 122 and bottom wall 126 also define a second end 134 opposite the inlet 130, a third end 138 extending between the first side 130 and the second side 134, and a fourth end 142 opposite the third side 138. The frame 94 also defines a first axis 146 extending through the volume 98 between the first and second sides 130, 134, and a second axis 150 transverse or perpendicular to the first axis 146 that extends through the volume 98 between the third and fourth sides 138, 142.

In the illustrated implementation, the distance between the top wall 122 and the bottom wall 126 is substantially equal to or slightly smaller than the desired height of the completed bale 42 so that the top and bottom walls 122, 126 may provide a compressive force on the top and bottom surfaces of the extrusion 82 and finished bale 42. While not illustrated, the distance between the top and bottom walls 122, 126 may also be adjustable to allow the wrap mechanism 38 to adjust the compressive forces applied to the extrusion 82 and finished bale 42. Furthermore, the distance between the top and bottom walls 122, 126 may be adjusted to accommodate bales 42 of different sizes and shapes (e.g., different heights). Still further, the distance between the top and bottom walls 122, 126 may also be used to vary the resistance applied of the extruded bale material 82 to resist the motion of the extrusion 82 toward the second end 134 of the volume 98.

While not illustrated, the frame 94 may also include rollers, rails, shuttles, and the like to aid the movement of the extrusion 82 and finished bale 42 within the volume 98.

Illustrated in FIGS. 1-4, the resistance assembly 102 of the wrap mechanism 38 includes an actuator 154 coupled to the frame 94 opposite the inlet 130 (e.g., proximate the second end 133), and a resistance plate 158 coupled to the actuator 154 and movable with respect thereto. The resistance plate 158 is at least partially positioned within the volume 98 of the frame 94 and is movable with respect thereto along the first axis 146 between a first position (see FIG. 1), where the resistance plate 158 is positioned proximate the inlet 130, and a second position (see FIG. 3), where the resistance plate 158 is positioned away from the inlet 130 (e.g., proximate the second end 133 of the volume 98).

During the baling process, the resistance plate 158 is configured to contact the leading surface 160 of the extrusion 82 and resist the extrusion's movement toward the second end 133. More specifically, the resistance plate 158 is initially positioned proximate the inlet 130 (i.e., in the first position) and in contact with the leading surface 160 of the extrusion 82. Therefore, as the leading surface 160 of the extrusion 82 moves toward the second end 134 of the volume 98 (e.g., as the extrusion 82 grows due to continued baling operations), the resistance plate 158 begins to move toward the second position. In response, the actuator 154 resists the motion of the resistance plate 158 producing a resistance force that is applied to the leading surface 160 of the extrusion 82 compressing the protrusion. Depending on the desired characteristics of the finished bale 42, the level of resistance provided by the actuator 154 may be varied to at least partially determine the resulting density of the bale 42. For example, higher resistance levels will result in higher density bales 42, while lower resistance levels will result in lower density bales 42.

Illustrated in FIGS. 1-4, the cutting assembly 110 of the wrap mechanism 38 includes an actuator 202 coupled to the frame 94 proximate the inlet 130, and a cutting plate 206 coupled to the actuator 202 and movable with respect thereto. More specifically, the cutting plate 206 is actively driven by the actuator 202 with respect to the frame 94 in a direction transverse or substantially perpendicular the first axis 146 (e.g., across the inlet 130) between a retracted position (see FIG. 1), where the cutting plate 206 is positioned outside the volume 98, and an actuated position (see FIG. 3), where the cutting plate 206 is at least partially positioned within the volume 98 and the volume 98 is isolated from the compression system 26. In the illustrated construction, the cutting plate 206 of the cutting assembly 110 includes a sharpened leading edge 208 able to pass through and cut the extrusion of crop material 82 when moving from the retracted to actuated positions.

During use, the cutting assembly 110 of the wrap mechanism 38 is configured to cut off a portion of the extrusion 82 to form the finished bale 42. More specifically, once a desired length of the extrusion 82 is positioned within the volume 98 of the wrap mechanism 38 (i.e., the length of the extrusion 82 positioned within the volume 98 is equal to the desired length of the final bale 42), the actuator 202 of the cutting assembly 110 biases the cutting plate 206 toward the actuated position. As the cutting plate 206 moves from the retracted position to the actuated position, the leading edge 208 of the cutting plate 206 cuts through the extrusion 82 isolating the portion of the extrusion 82 positioned within the volume 98 from the remainder of the extrusion 82 thereby creating the final bale 42. Once the cutting plate 206 is in the actuated position, the cutting plate 206 acts as a resistance member maintaining resistive forces against the newly formed leading surface 160 of the extrusion 82.

Illustrated in FIGS. 1-4, the ejection assembly 106 of the wrap mechanism 38 includes an actuator 178 coupled to the frame 94 proximate the third side 138, and an ejection plate 182 coupled to the actuator 178 and movable with respect thereto. The ejection plate 182 is at least partially positioned within the volume 98 of the frame 94 and is movable with respect to the frame 94 along the second axis 150 between a first position (see FIG. 1), where the ejection plate 182 is positioned proximate the third side 138 of the volume 98, and a second position (see FIG. 4), where the ejection plate 182 is positioned proximate the fourth side 142 of the volume 98.

During use, the ejection assembly 106 is configured to bias the finished bale 42 positioned within the volume 98 along the second axis 150 and into the wrap chute 114. More specifically, after the finished bale 42 has been isolated from the compression system 26 by the cutting plate 206, moving the ejection plate 182 from the first position toward the second position causes the completed bale 42 to move into the passageway 226 of the wrap chute 114 for subsequent wrapping (described below).

Illustrated in FIGS. 1-4, the wrap chute 114 of the wrap mechanism 38 includes a base wall 218 at least partially forming the third side 138 of the volume 98, and a perimeter wall 222 extending outwardly from the base wall 218 to define a passageway 226 in communication with the volume 98 therein. During use, the wrap chute 114 is configured to at least partially receive the final bale 42 within the passageway 226 such that the perimeter wall 222 contacts and maintains the bale 42 under compression. Once the bale 42 is positioned within the wrap chute 114, wrapping material 230 may be wrapped around the exterior surface 234 of the perimeter wall 222 thereby encompassing the bale 42 contained therein (e.g., with the perimeter wall 222 positioned between the bale 42 and the wrap material 46).

The passageway 226 of the wrap chute 114 is substantially rectangular in cross-sectional shape and includes a chute axis 238 extending longitudinally therethrough. More specifically, the illustrated passageway 226 defines a cross-sectional size and shape substantially corresponding with the height and length of the finished bale 42. In the illustrated implementation, the passageway 226 is substantially constant in cross-sectional shape along its entire axial length, however, in other implementations the cross-sectional shape and size of the passageway 226 may vary along its axial length. For example, the passageway 226 may reduce in cross-sectional size (i.e., neck inward) as it extends away from the base wall 218 to help compress the sides of the bale 42 as it enters the chute 114.

The perimeter wall 222 of the wrap chute 114 extends outwardly from the base wall 218 and along at least a portion of the perimeter of the passageway 226. More specifically, the perimeter wall 222 extends from the base wall 218 a distance substantially corresponding to the width of the finished bale 42 so that the entire finished bale 42 may be positioned within the passageway 226 at any one time. In the illustrated implementation, the perimeter wall 222 includes four substantially planar portions 242a, 242b, 242c, 242d connected by four rounded corner portions 246. Together, the portions 242 and corners 246 produce a substantially continuous perimeter wall 222 extending along the entire periphery of the passageway 226. In alternative implementations, the perimeter wall 222 may be formed from multiple, individual walls (not shown) extending along portions of the perimeter of the passageway 226. In still other implementations, the size, location, and orientation of the perimeter wall 222 may be adjustable to accommodate finished bales 42 of different sizes and shapes.

In the illustrated implementation, the perimeter wall 222 defines a plurality of apertures or notches 250 open to the passageway 226 and configured to permit the wrap material 46 wrapped around the exterior surface 234 of the perimeter wall 222 to contact the bale 42 positioned in the passageway 226. More specifically, each corner portion 246 of the wrap chute 114 includes a notch 250 exposing the corners of a bale 42 positioned within the passageway 226 and permitting the wrap material 46 to directly engage the corner edge of the finished bale 42. The direct engagement between the wrap material 46 and the bale 42 allows the two elements to move together as a unit when the bale 42 is moved with respect to the perimeter wall 222 within the wrap chute 114. Furthermore, the interaction between the bale 42 and the wrap material 46 is such that the wrap material 46 effectively becomes coupled to the bale 42 in the areas where the two are in direct engagement with one another. In contrast, the wrap material 46 tends to slide relative to the perimeter wall 222. Thus, the wrap material 46 will not fall off the bale 42 when being ejected from the wrap chute 114.

While the illustrated notches 250 are formed into a respective corner portion 246 of the perimeter wall 222, in alternative implementation, more or fewer notches 250 may be present or positioned in alternative positions on the perimeter wall 222 such as the planar portions 242 and the like.

Illustrated in FIGS. 6a-6d, the wrap assembly 118 of the wrap mechanism 38 includes a wrap arm 258 mounted to the frame 94 and having a mounting point 262 movable with respect to the wrap chute 114, a shaft 266 coupled to the mounting point 262 of the wrap arm 258, a roll 272 of wrap material 46 rotatably mounted to the shaft 266, and a brake assembly 276 operatively coupled to the shaft 266 and configured to at least partially limit the rotation of the roll 272. During use, the wrap arm 258 is configured to direct the shaft 266 (and the roll 272 attached thereto) along a wrap path 280 (see FIGS. 5a-5c) to apply the wrap material 46 to the exterior of a bale 42 positioned within the passageway 226 of the wrap chute 114. In some implementations, the wrap arm 258 is configured such that the wrap path 280 may be adjusted to accommodate bales 42 of different sizes, shapes, and densities.

Figure 5A:
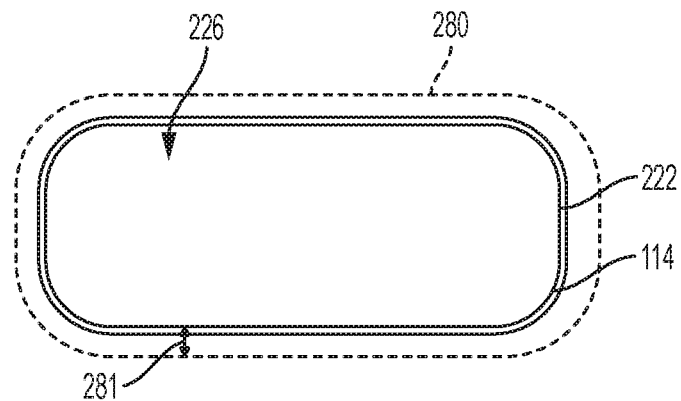
FIGS. 5a-5c illustrate various wrap paths of the wrap assembly.
Figure 5B:
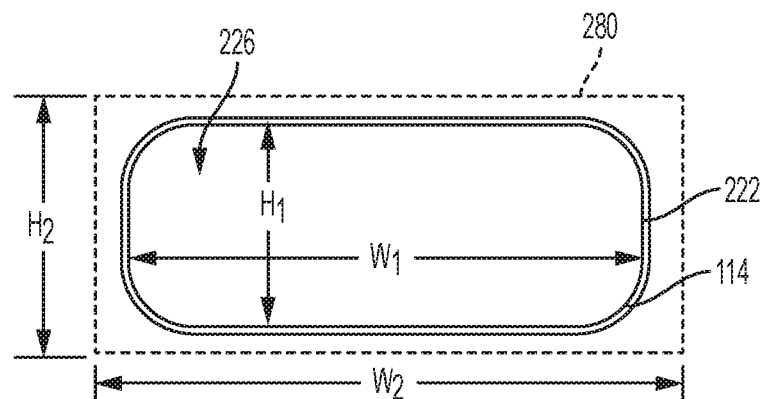
Figure 5C:
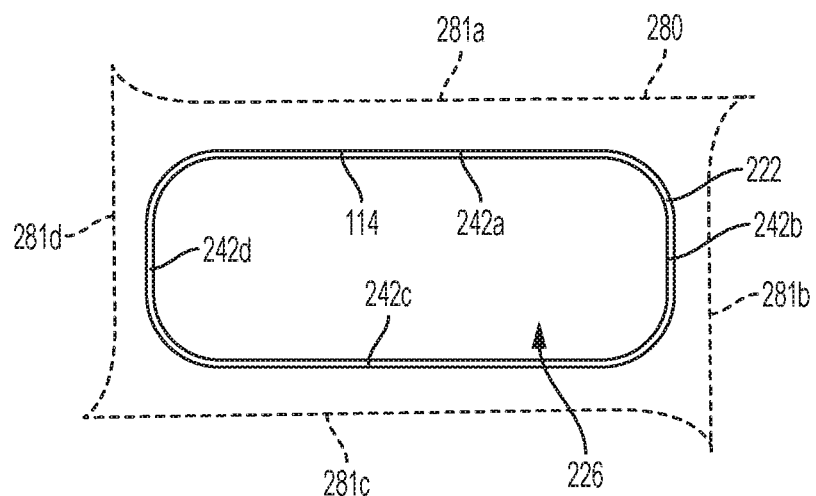
Figure 6A:
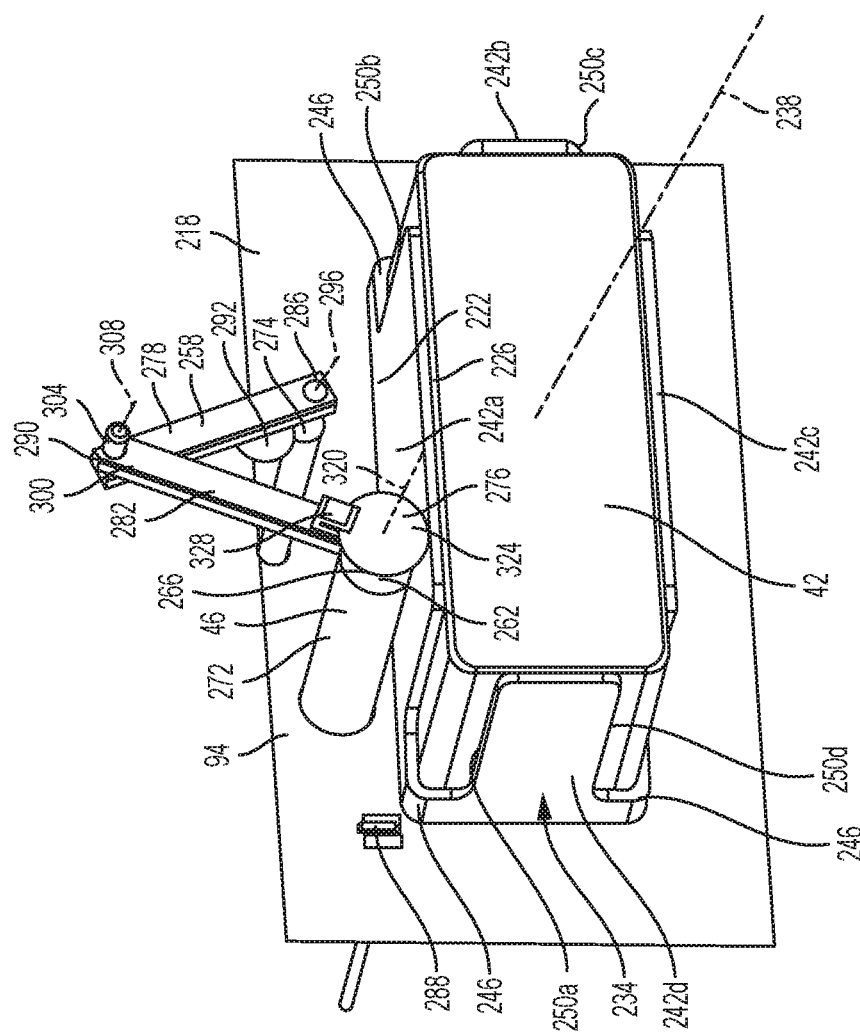
FIGS. 6a-6d illustrate a first implementation of the wrap assembly in various positions of the wrapping process.
Figure 6B:
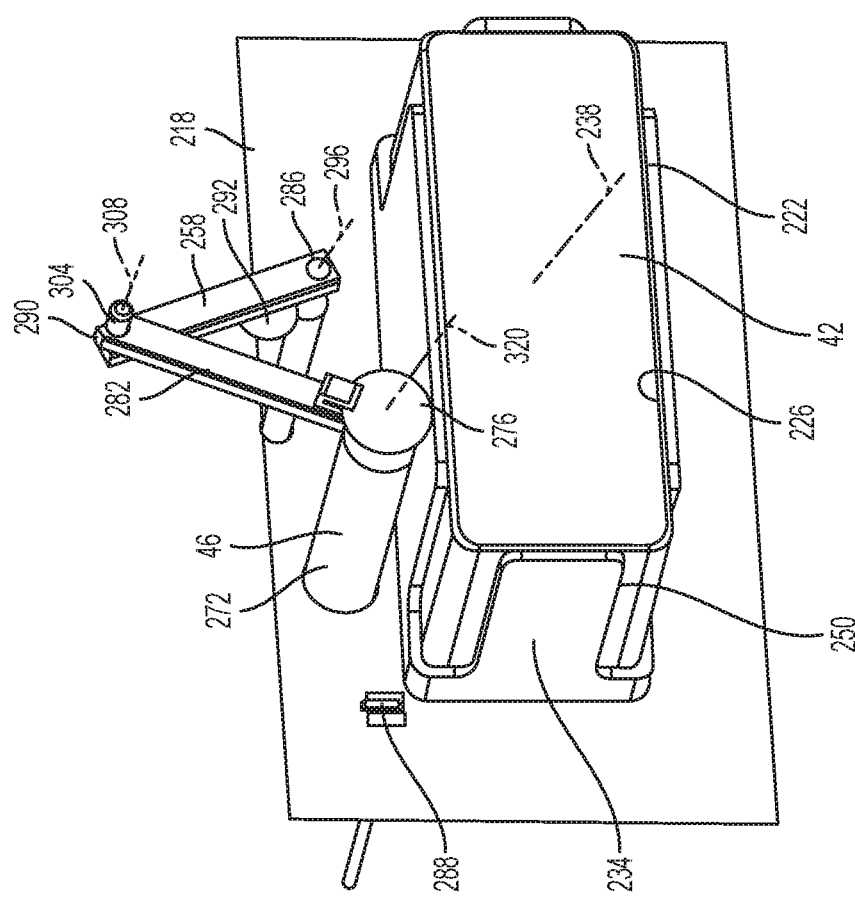
Figure 6C:
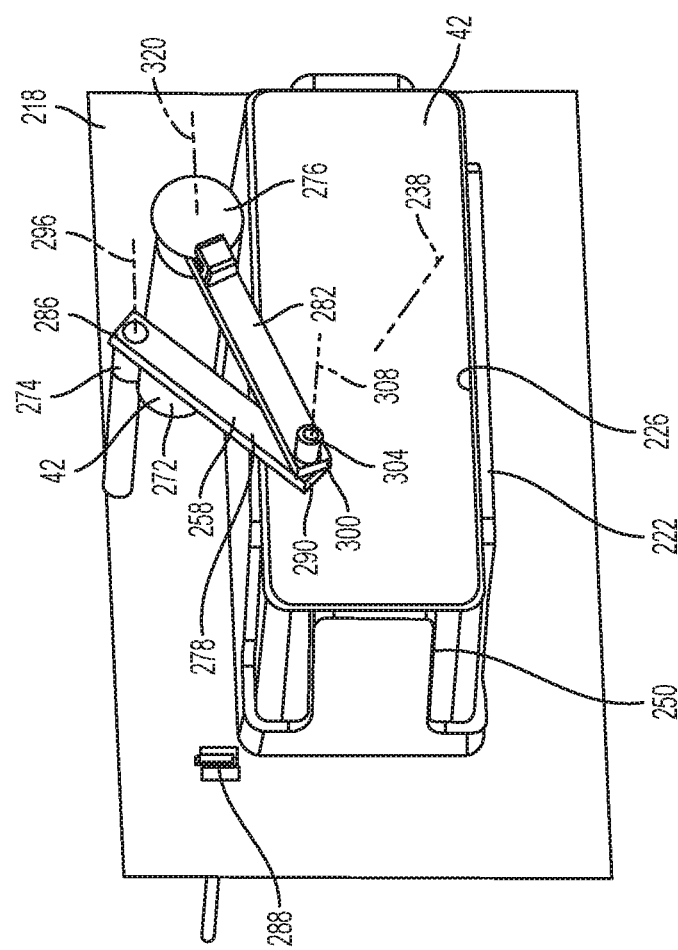
Figure 6D:
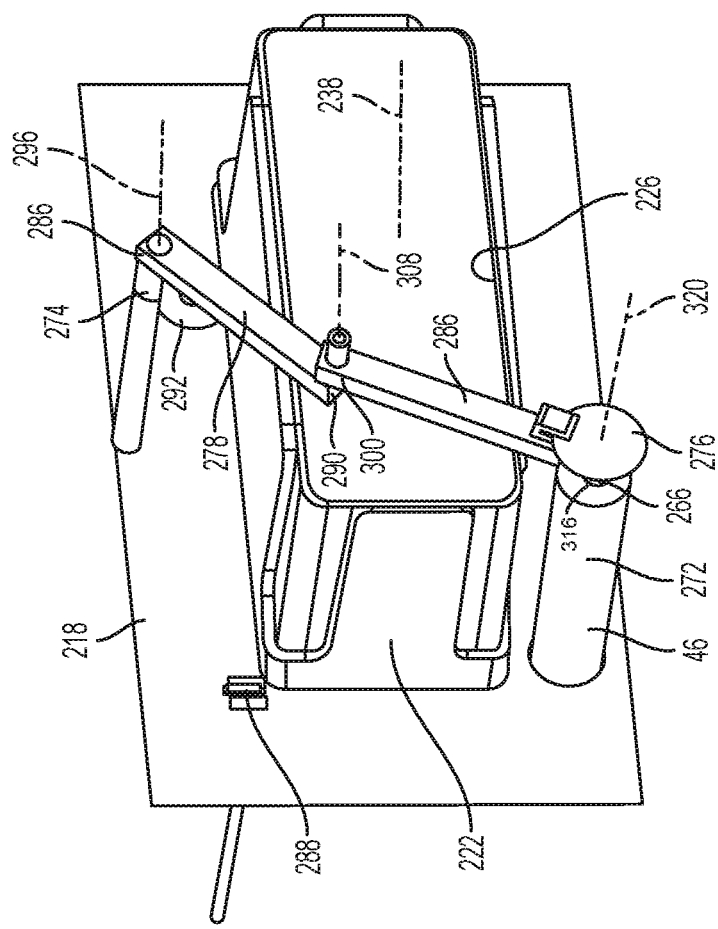
Figure 7A:
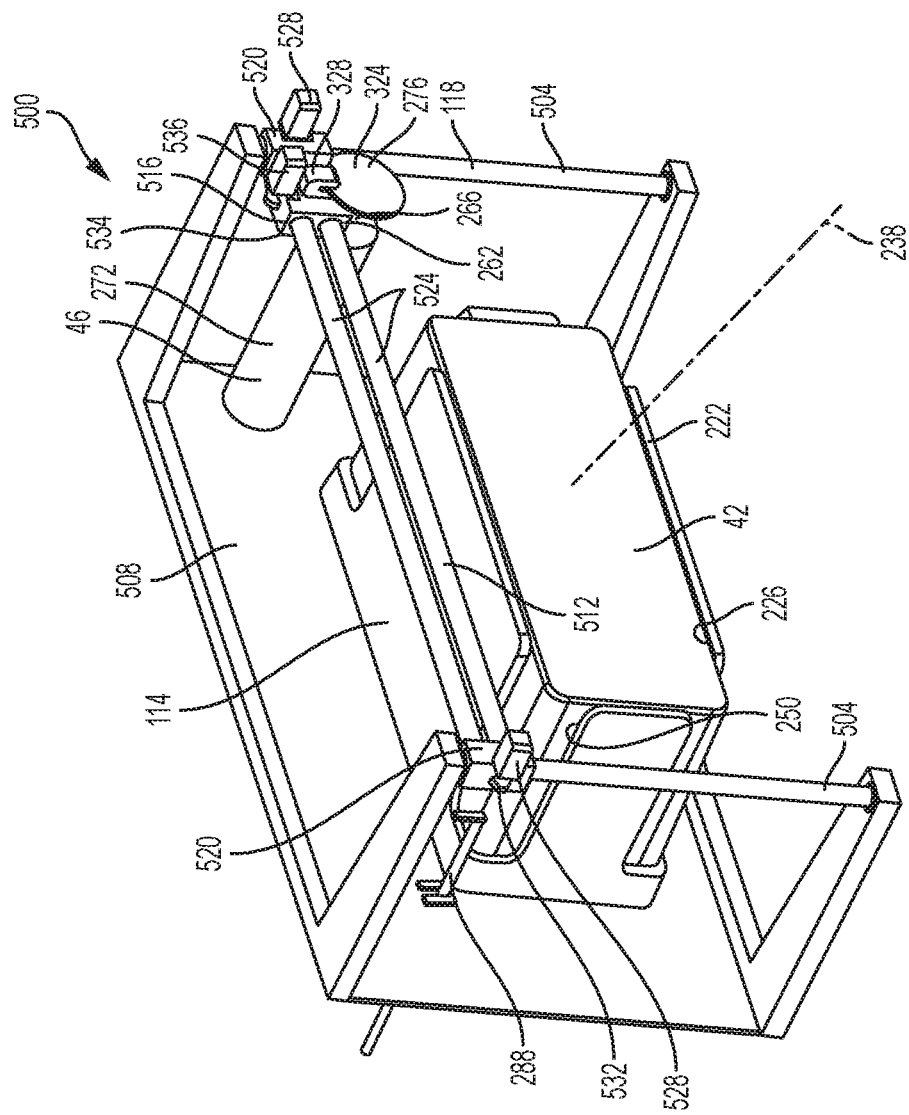
FIGS. 7a-7d illustrate a second implementation of the wrap assembly in various positions of the wrapping process.
Figure 7B:
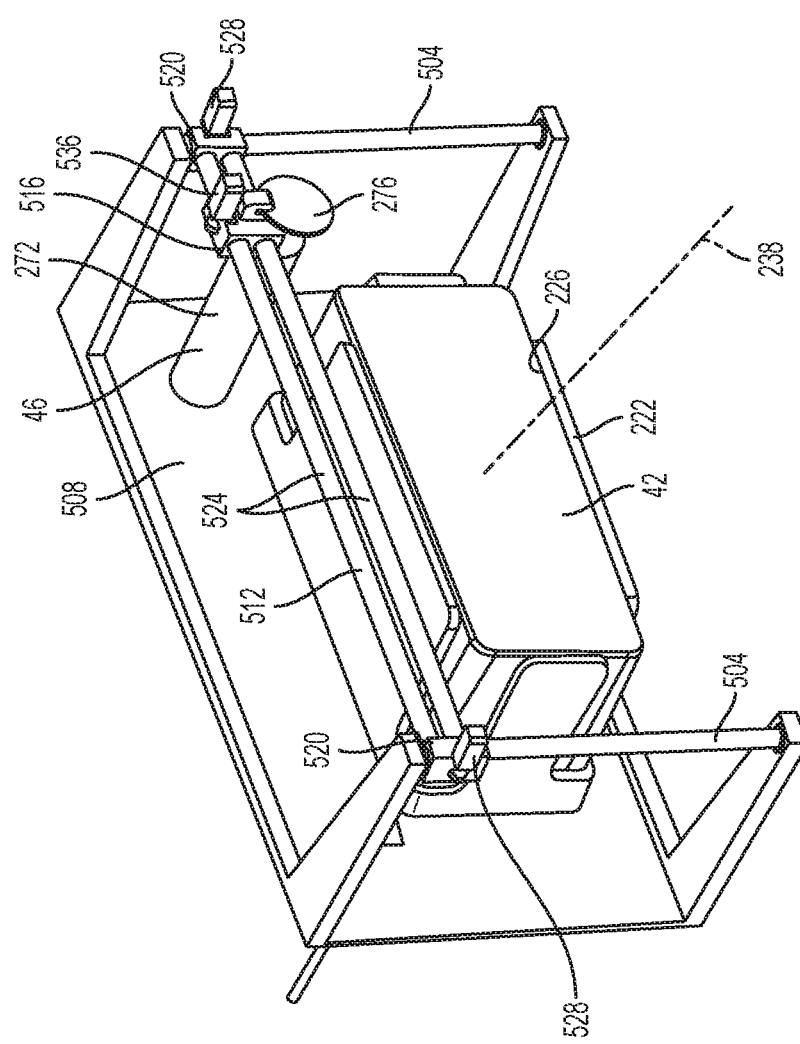
Figure 7C:
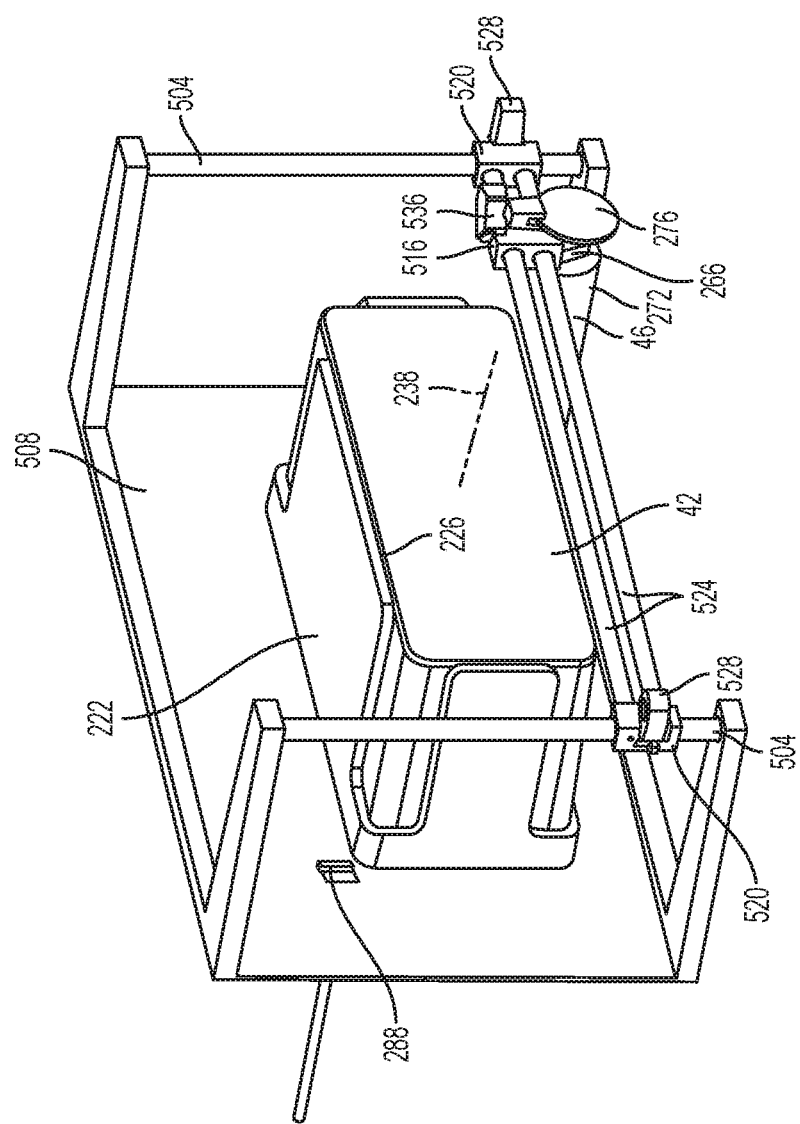
Figure 7D:
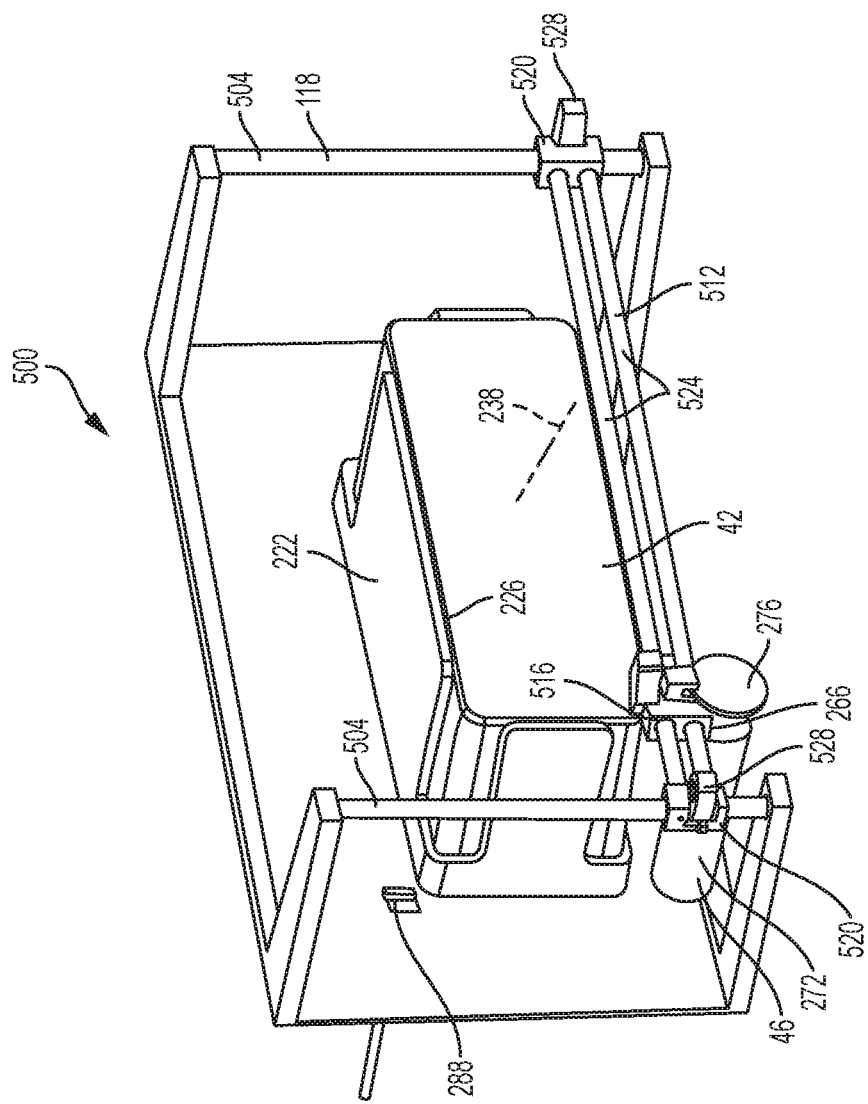
Figure 8A:
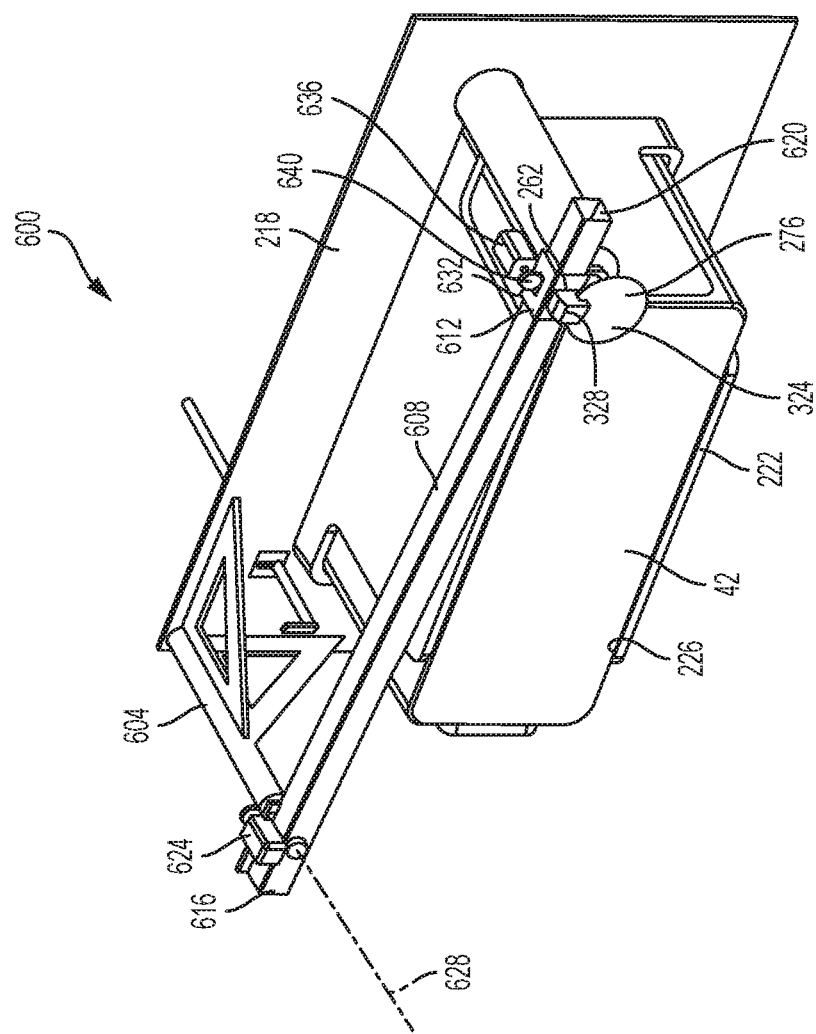
Figure 8B:
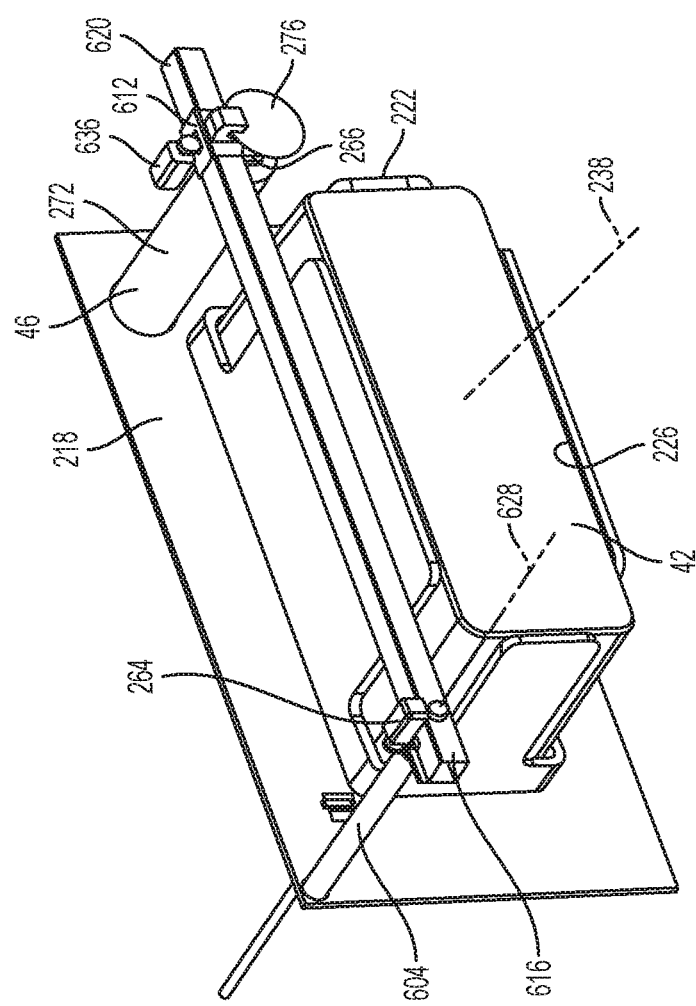
Figure 8C:
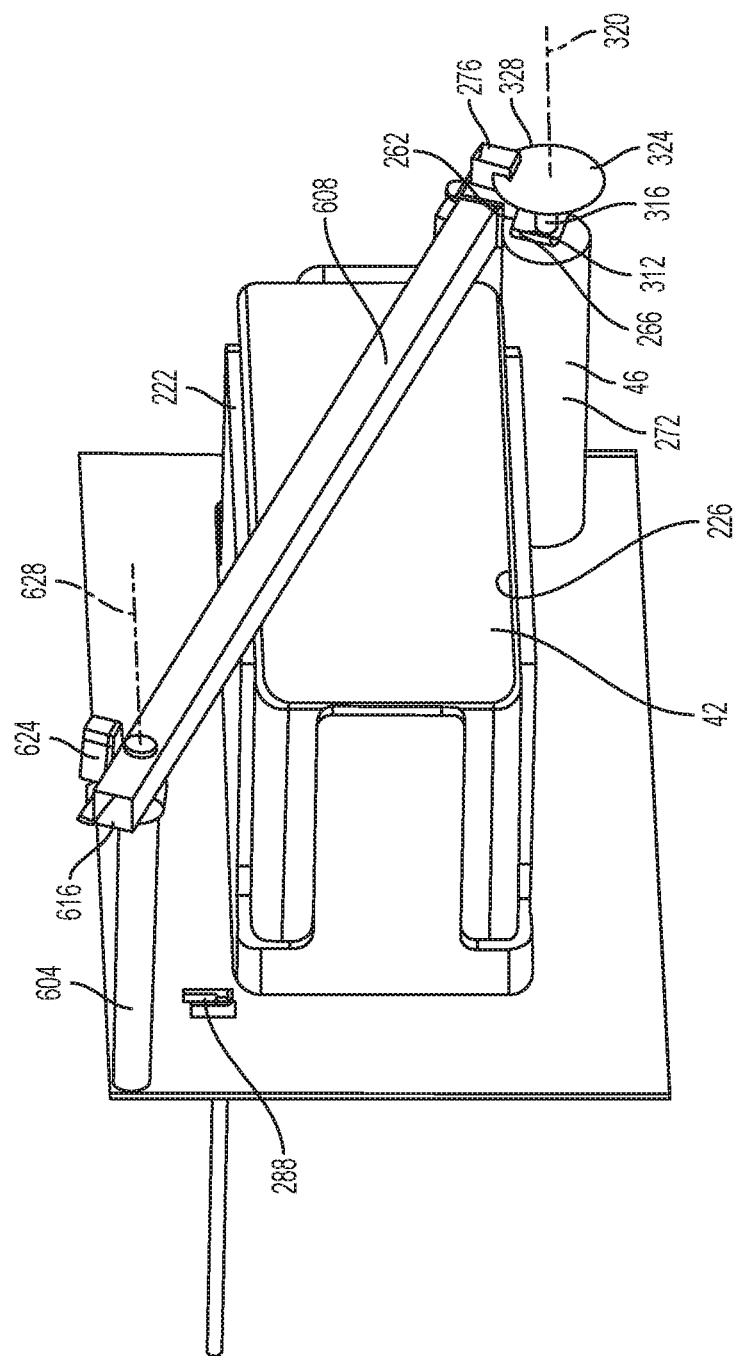

Illustrated in FIGS. 5a-5c, the wrap path 280 of the wrap assembly 118 partially or completely encircles the perimeter wall 222 and is generally non-circular in shape. More specifically, the wrap path 280 is generally shaped to correspond with the cross-sectional shape of the passageway 226. In some implementations, the wrap path 280 may include a substantially rectangular shape including any shape having two sets of parallel sides. In other implementations, the wrap path 280 may include a scaled contour of the cross-sectional shape of the passageway 226. For example, if the cross-sectional shape of the passageway 226 includes a rectangle sized 2 units high $H_1$ by 4 units wide $W_1$, the wrap path 280 may include a scaled contour that includes a rectangle that is 3 units high $H_2$ by 6 units wide $W_2$ (e.g., scaled up by 1.5×; see FIG. 5b). In other implementations, the wrap path 280 may be configured such that the wrap path 280 maintains substantially a constant distance from the perimeter wall 222 for at least one complete rotation about the passageway 226 (see FIG. 5a).

In still other implementations, the wrap path 280 may only maintain a substantially constant distance from each planar portion 242a, 242b, 242c, 242d of the perimeter wall 222 (see FIG. 5c). In still other implementations, the wrap path 280 may include a plurality of path portions 281a, 281b, 281c, 281d each extending parallel to a corresponding one of the substantially planar wall portions 242a, 242b, 242c, 242d, of the perimeter wall 222 (see FIG. 5c). In such implementations, each path portion 281a, 281b, 281c, 281d of the wrap path 280 may be substantially parallel a corresponding wall portion 242a, 242b, 242c, 242d but extend a distance greater than the corresponding wall portion 242a, 242b, 242c, 242d (see FIG. 5c).

In still other implementations, the shape of the wrap path 280 may be dictated by the resulting tension in the wrap material 46. In such implementations, the wrap path 280 may be shaped such that the wrap material 46 is unwound from the roll 272 at a substantially constant tension for at least one complete rotation about the passageway 222.

In still other implementations, the wrap path 280 may be subdivided into one or more segments (not shown) each of which are separated by a notch 250 formed into the perimeter wall 222. For example, applying wrap material 46 to the perimeter wall 222 between a first notch 250*a* and a second notch 250*b* (e.g., along the first planar wall portion 242*a*) constitutes a first segment of the wrap path 280, while applying wrap material 46 between the second notch 250*b* and a third notch 250*c* (e.g., along the second planar wall portion 242*b*) constitutes a second segment of the wrap path 280, while applying wrap material 46 between the third notch 250*c* and a fourth notch 250*d* (e.g., along the third planar portion 242*c*) constitutes a third segment of the wrap path 280, and applying wrap material between the fourth notch 250*d* and the first notch 250*a* (e.g., along the fourth planar portion 242*d*) constitutes a fourth segment of the wrap path 280 (see FIG. 6A). In such implementations, each segment is separated by a notch 250 which allows the wrap material 46 to directly engage the bale 42 and "lock in" the tension in the wrap material 46 over the previous segment. Thus, the magnitude of the tension applied to each segment can be adjusted independently.

Illustrated in FIGS. 6*a*-6*d*, the roll 272 of wrap material 254 is configured to be positioned on the spindle 316 of the shaft 266 and rotate therewith (described below). The roll 272 also includes a length of wrap material 46 wound about the roll 272. The wrap material 254 may include any type of wrap material as is known in the bale wrapping art such as, but not limited to, traditional net wrap, solid plastic wrap, plastic wrap with apertures, and breathable wrap. During use, the wrap material 46 is unwound from the roll 272 during the wrapping process.

Illustrated in FIGS. 6*a*-6*d*, the wrap arm 258 of the wrap assembly 118 includes a support 274 fixedly coupled to the base wall 218, a first member or first wrapping arm 278 pivotably coupled to support 274, and a second member or second wrapping arm 282 pivotably coupled to the first member 278 and including the mounting point 262. During use, the first member 278 pivots with respect to the support 274 and the second member 282 pivots with respect to the first member 278 to dictate the relative location of the mounting point 262 with respect to the wrap chute 114 (e.g., along the wrap path 280).

The first member 278 of the wrap arm 258 is substantially elongated in shape having a first end 286 pivotably coupled to the support 274, and a second end 290 opposite the first end 286. The first member 278 also includes a first actuator 292 positioned proximate the first end 286 and in operable communication with the support 274. During use, the first actuator 294 is configured to generate torque causing the first member 278 to pivot with respect to the support 274 about a first axis 296. In the illustrated implementation, the first actuator 294 includes a servo motor, however in alternative implementations, hydraulic actuators, linear actuators, and the like may be used.

The second member 282 of the wrap arm 258 is substantially elongated in shape having a first end 300 pivotably coupled to the second end 290 of the first member 278, and the mounting point 262 positioned opposite the first end 300. The second member 282 also includes a second actuator 304 positioned proximate the first end 300 and in operable communication with the first member 278. During use, the second actuator 304 is configured to generate torque causing the second member 282 to pivot with respect to the first member 278 about a second axis 308. In the illustrated implementation, the second actuator 304 includes a servo motor, however in alternative implementations, hydraulic actuators, linear actuators, and the like may be used.

In the illustrated construction, both the first axis 296 and the second axis 308 are substantially parallel to the chute axis 238 of the wrap chute 114. As such, the mounting point 262 may be moved with two degrees of freedom within a plane that is oriented normal to the chute axis 238. In alternative implementations, more of fewer members and actuators may be utilized (not shown) to provide additional degrees of freedom as necessary to produce the desired motion of the mounting point 262.

Illustrated in FIGS. 6*a*-6*d*, the shaft 266 of the wrap assembly 118 is coupled to the mounting point 262 of the wrap arm 258*a* and configured to rotatably support the roll 272 of wrap material 46 thereon. More specifically, the shaft 266 includes a base 312 fixedly coupled to the mounting point 262 of the wrap arm 258, and a spindle 316 mounted to the base 312 for rotation about a shaft axis 320. In the illustrated construction, the shaft axis 320 is substantially parallel to the chute axis 238 so that the wrap material 46 is able to lay flat against the outer surface 160 of the perimeter wall 222.

The spindle 316 of the shaft 266 is substantially elongated in shape and configured to be detachably coupled to the roll 272 of wrap material 46. More specifically, the spindle 316 may include one or more protrusions, keyways, splines, and the like (not shown) configured to engage with corresponding geometry of the roll 272 so that when a roll 272 is positioned on the spindle 316, the roll 272 and spindle 316 rotate together as a unit. Furthermore, the spindle 316 may include some form of locking assembly (not shown) to secure the roll 272 on the spindle 316 during operation.

Illustrated in FIGS. 6*a*-6*d*, the brake assembly 276 of the wrap assembly 118 includes a brake disk 324 fixedly coupled to one of the spindle 316 and the base 312 of the shaft 266, and a caliper 328 selectively engaging the brake disk 324 and fixedly coupled to the other of the spindle 316 and the base 312 of the shaft 266. During use, the brake assembly 276 is configured to selectively resist the relative rotation of the spindle 316 (and the roll 272 positioned thereon) with respect to the base 312 about the shaft axis 320. By doing so, the brake assembly 276 is able to at least partially dictate the tension contained within the wrap material 46 being applied to the bale 42 (e.g., a tension profile) independent of the current diameter of the roll 272. While the brake assembly 276 of the illustrated implementation includes a disk brake system, it is to be understood that any system able to selectively restrict the rotation of the spindle 316 may be used, such as a drum brake, a hydraulic motor, an electric motor, and the like.

The unroll tension profile of the wrap assembly 118 includes the level of tension imparted on the wrap material 46 as it is being unrolled from the roll 272 as the shaft 320 travels around the corresponding wrap path 280. In some implementations, the unroll tension profile may include maintaining a substantially constant level of tension in the wrap material 46 for at least one complete circuit about the passageway 226. In still other implementations, the unroll tension profile may vary from wrap material layer to wrap material layer. For example, the unroll tension profile may include a first tension level for the first layer of wrap material 46, and a second tension level for the second layer of wrap material 46 different from the first tension level. In still other implementations, the unroll tension profile may vary over the distance of the wrap path 280.

Figure 9:
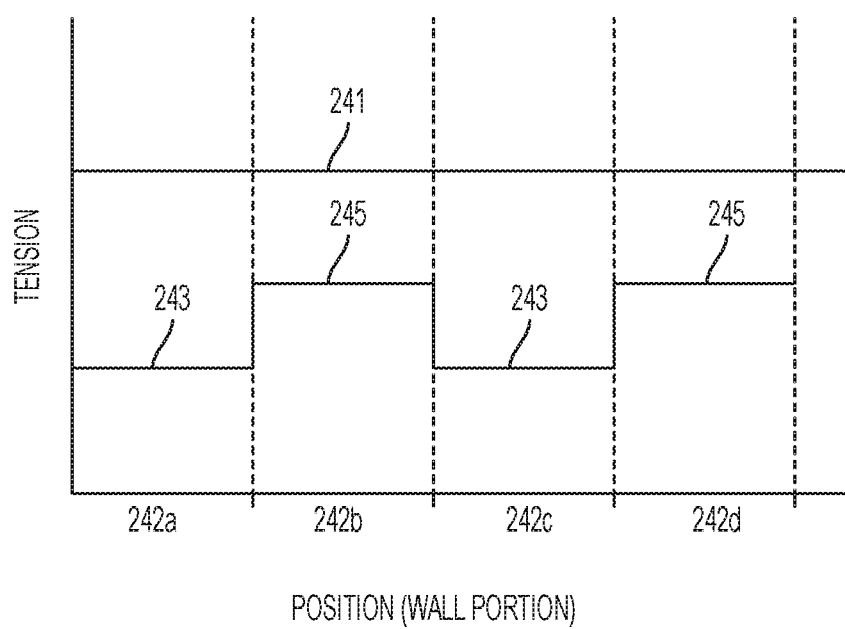
FIG. 9 illustrates various tension profiles.

In other implementations, the applied tension profile includes the level of tension in the wrap material 46 after it has been applied to the bale 42. In some implementation, the applied tension profile may include having a constant level of tension 241 for a complete circuit about the passageway 226 or wrap path 280 (see FIG. 9). In other implementations, the applied tension profile may include having the tension level vary over the length of the wrap path 280. For example, the wrap material 46 may be applied at a first tension level 243 across the first planar wall portion 242a, a second tension level 245 different from the first tension level across the second planar wall portion 242b, and so on (see FIG. 9). In still other implementations, the tension profile may vary from wrap material layer to wrap material layer. For example, the tension profile may include a first tension level for the first layer of wrap material 46, and a second tension level for the second layer of wrap material 46 different from the first tension level.

In still other implementations, the tension level of the wrap material 46 may vary for each segments of the wrap path (described above). In such implementations, the profile map illustrates a substantially instantaneous change in tension levels between different segments. This change in tension is possible due to the fact that the various segments are separated by a notch 250. As such, the wrap material 46 engages and becomes substantially fixed relative to the bale 46 at the notches 250 (e.g., the exposed corner regions of the bale 46; described above). As such, the brake assembly 276 and wrap arm 258 are able to apply and adjust the tension of each segment of the wrap path 280 independently of one another.

During the baling operation, the wrap mechanism 38 receives a steady flow of compressed crop material from of the compression system 26 in the form of a continuously growing extrusion 82. More specifically, the lead surface 160 of the extrusion 82 moves through the inlet 130, into the volume 98, and toward the second end 134. As described above, the resistance plate 158 of the resistance assembly 102 contacts the lead surface 160 of the extrusion 82 providing a resisting force against the movement of the extrusion 82 toward the second end 134 thereby maintaining the extrusion 82 under compression. As the extrusion 82 continues to grow during the baling operation, the resistance plate 158 moves from the first position (FIG. 1) toward the second position (FIG. 3).

Figure 3:
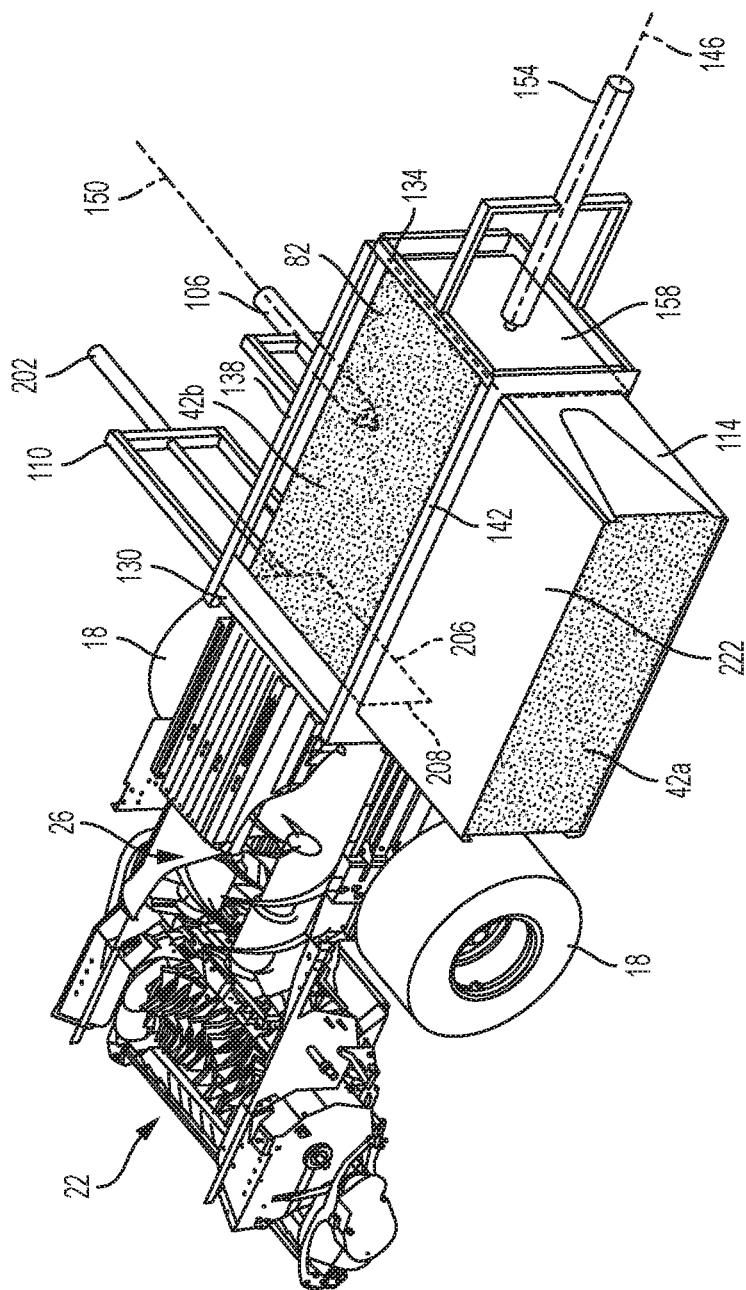

Once the extrusion 82 has expanded such that the length of the compressed extrusion material positioned beyond the inlet 130 substantially corresponds with the desired final bale length (e.g., the resistance plate 158 is in the second position; see FIG. 3), the cutting assembly 110 begins the cutting procedure.

During the cutting procedure, the cutting plate 206 moves from the retracted position (FIG. 1) toward the deployed position (FIG. 3) causing the leading edge 208 of the cutting plate 206 to cut the extrusion 82 thereby forming the a first bale 42a within the volume 98 and creating a new lead surface 160b for the extrusion 82. The cutting plate 206 also covers the inlet 130 of the volume 98 so that the new lead surface 160 cannot enter the volume 98.

Figure 4:
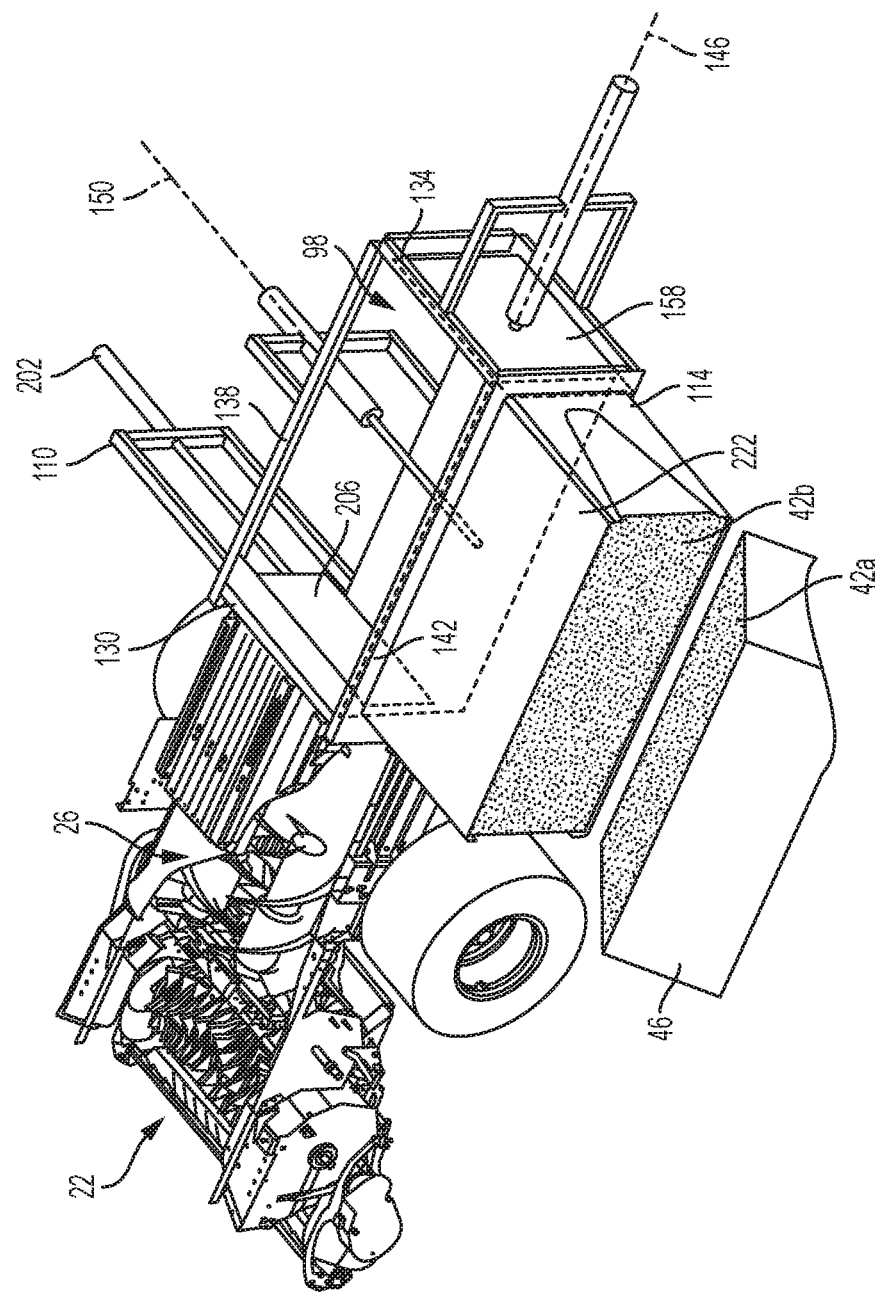

With the first bale 42a formed, the ejection assembly 106 begins the ejection procedure. During the ejection procedure the ejection plate 138 moves from the first position (FIG. 3) toward the second position (FIG. 4). By doing so, the ejection plate 182 biases the first bale 42a out of the volume 98 and into the passageway 226 of the wrap chute 114. The ejection plate 182 continues to bias the bale 42a until the entire bale 42a is positioned within the passageway 226.

With the bale 42 positioned within the passageway 226, the wrapping procedure begins. During the wrapping procedure, the wrapping arm 258 begins moving the shaft 266 along the first segment of the desired wrap path 280 (described above) causing a length of wrapping material 46 to unroll from the roll 272 and be applied to the exterior surface 234 of the perimeter wall 222 and the first bale 42 (e.g., via contact through the notches 250 formed in the wall 222). Furthermore, the brake assembly 276 selectively resists the rotation of the roll 272 with respect to the base 312 creating tension within the applied wrap material 46.

As the wrapping arm 258 travels along the first segment and toward the first notch 250a, the brake assembly 276 adjusts the tension within the wrap material 46. More specifically, the brake assembly 276 is configured to generate the desired tension at the moment when the wrap material 46 is applied to the first notch 250a of the wall 222. By doing so, the brake assembly 276 assures the tension is at the proper value when the wrap material 46 engages the bale 42 and "locks in" the tension over the first segment (described above). The wrapping arm 258 then travels along the second segment of the wrap path 280 and toward the second notch 250b. Again, the brake assembly 276 is configured to assure that the tension in the wrap material 46 is at the proper level when the wrap material 46 is applied to the second notch 250b and the tension for the second segment is "locked in." To note, the engagement of the wrap material 46 with the bale 42 at the corresponding notches 250 allows the tension over each segment to be different without effecting the tension of the previous segment. The wrapping arm 258 and brake assembly 276 then continue this process for each subsequent segment until a complete cycle of the wrap path 280 is complete.

The wrapping arm 258 continues to direct the shaft 266 along the wrap route 280 until the desired number of revolutions (e.g., layers of wrap material 46) has been applied. Once complete, a cutter 288 (see FIG. 6a) as is well known in the art severs the applied wrap material 46 from the roll 272.

While the current implementation utilizes the same wrap route 280 and tension profile for each revolution about the passageway 226, it is to be understood that in alternative implementations each revolution about the passageway 226 may include a unique wrap route 280 and/or tension profile.

Concurrent with the wrapping procedure, a reset procedure also begins. During the reset procedure the ejection plate 182 returns to the first position (FIG. 1) proximate the third end 138 of the frame 94 and the resistance plate 158 returns to the first position (FIG. 1). Furthermore, the cutting plate 206 returns to the retracted position (FIG. 1) allowing the new lead surface 160b of the extrusion 82 to contact the resistance plate 158. Once the new lead surface 160b contacts the resistance plate 158, the extrusion 82 begins biasing the resistance plate 158 toward the second position, as described above, until sufficient extrusion material has entered the volume 82 for the cutting procedure to begin, as described above, to create a second bale 42b (see FIG. 3).

Once the wrapping procedure and cutting procedure are both completed, the ejection plate 182 begins the ejection procedure. In this instance, however, in addition to moving the second bale 42b into the wrap chute 114 as describe above, the first bale 42a is biased by the second bale 42a causing the first bale 42 to be ejected from the wrap chute 114 for subsequent collection (see FIG. 4). Once the second bale 42b is positioned within the wrap chute 114, the process can begin anew.

FIGS. 7a-7d illustrate a second implementation of a wrap arm 500. The wrap arm 500 includes a first pair of rails 504 extending substantially parallel one another and fixed relative to the base wall 508, a first shuttle 512 movable with respect to the first set of rails 504, and a second shuttle 516 movable with respect to the first shuttle 512 and including the mounting point 262. In the illustrated construction, the first pair of rails 504 are substantially parallel to the base wall 508.

The first shuttle 512 of the wrap arm 500 includes a pair of end blocks 520 and a second pair of rails 524 extending between the end blocks 520. When assembled, each end block 520 is slidably coupled to a corresponding one of the first pair of rails 504 for movement along the length thereof. Furthermore, each rail of the second pair of rails 524 is oriented transverse or substantially perpendicular to the first pair of rails 504. The first shuttle 512 also includes one or more actuators 528 coupled to a corresponding one of the end blocks 520 and configured to provide a force for driving the first shuttle 512 along the length of the first pair of rails 504. In the illustrated construction, each actuator 528 includes a servo motor having a drive wheel 532 configured to engage a corresponding one of the first set of rails 504. However in alternative implementations, actuator 528 may include a linear actuator, hydraulic actuator, and the like.

The second shuttle 516 of the wrap arm 500 includes a body 534 slidably coupled to the second pair of rails 524 for movement along the length thereof. The second shuttle 516 also includes the mounting point 262 to which the shaft 266 may be coupled. The second shuttle 516 further includes an actuator 536 coupled to the body 532 and configured to provide a force for driving the second shuttle 516 along the length of the second pair of rails 524. In the illustrated construction, the actuator 536 includes a servo motor having a drive wheel 540 configured to engage one of the second set of rails 524. However in alternative implementations, the actuator 536 may include a linear actuator, hydraulic actuator, and the like.

During use, movement of the first and second shuttles 512, 516 causes the mounting point 262, and the corresponding shaft 266 to move with respect to the bale chute 114 (e.g., along a wrap path 280). Furthermore, the orientation of the first and second pair of rails 504, 524 allow the mounting point 262 to be moved with two degrees of freedom within a plan that is oriented normal to the chute axis 238. In alternative implementations, more or fewer shuttles may be used to provide additional degrees of freedom as necessary to produce the desired motion of the mounting point 262.

FIGS. 8a-8d illustrate a third implementation of the wrap arm 600. The wrap arm 600 includes a support 604 fixedly coupled to the base wall 218 of the bale chute 114, a first member or first wrapping arm 608 pivotably coupled to the support 604, and a slider 612 slidably coupled to the first member 608 and defining the mounting point 262.

The first member 608 of the wrap arm 600 is substantially elongated in shape having a first end 616 pivotably coupled to the support 604, and a second end 620 opposite the first end 616. The first member 608 also includes a first actuator 624 positioned proximate the first end 616 and in operable communication with the support 604. During use, the first actuator 624 is configured to generate torque causing the first member 608 to pivot with respect to the support 604 about a first axis 628. In the illustrated implementation, the first actuator 624 includes a servo motor, but in alternative implementations, hydraulic actuators, linear actuators, and the like may be used.

The slider 612 of the wrap arm 600 includes a body 632 slidably coupled to the first member 608 and movable along the length thereof between the first end 616 and the second end 620. The slider 612 also includes the mounting point 262 and a second actuator 636 configured to provide a force for driving the slider 612 along the length of the first member 608. In the illustrated implementation, the actuator 636 includes a servo motor having a drive wheel 640 configured to engage the first member 608. However in alternative implementations, actuator 636 may include a linear actuator, hydraulic actuator, and the like.

During use, the pivotal movement of the first member 608 with respect to the support 604 and the translational motion of the slider 612 with respect to the first member 608 allow the mounting point 262 to be moved with two degrees of freedom within a plane that is oriented substantially normal to the chute axis 238. In alternative implementations, members or sliders may be used to provide additional degrees of freedom as necessary to produce the desired motion of the mounting point 262.

Various features of the disclosure are set forth in the following claims.

What is claimed is:

1. A bale wrap mechanism for use with a roll of wrap material, the bale wrap mechanism comprising:
    a frame including a wrap chute formed from one or more perimeter walls, wherein the wrap chute includes a wrap axis extending longitudinally therethrough, and wherein the one or more perimeter walls at least partially define a passageway;
    a first wrapping arm having a first end pivotably coupled to the frame and a second end opposite the first end;
    a slider slidably coupled to the first wrapping arm and defining a mounting point, wherein the slider is movable with respect to the first wrapping arm between the first end and the second end of the first wrapping arm; and
    a shaft coupled to the mounting point, wherein the shaft is configured to rotatably support the roll of wrap material thereon,
    wherein the shaft is configured to travel along a wrap path during a wrapping process, wherein the wrap path surrounds the passageway, and wherein the wrap path is non-circular in shape.

2. The bale wrap mechanism of claim 1, wherein the wrap path is rectangular in shape.

3. The bale wrap mechanism of claim 1, wherein the passageway is rectangular in cross-sectional shape taken perpendicular to the wrap axis.

4. The bale wrap mechanism of claim 1, further comprising a brake assembly configured to adjust the speed at which a length of wrap material is dispensed from the roll of wrap material.

5. The bale wrap mechanism of claim 1, wherein first member is pivotable with respect to the frame about a first axis, and wherein the first axis is parallel the wrap axis.

6. The bale wrap mechanism of claim 1, further comprising a brake assembly configured to adjust the tension of the wrap material dispensed from the roll of wrap material.

7. The bale wrap mechanism of claim 6, wherein the brake assembly is configured to maintain a substantially constant applied tension profile for at least one complete cycle about the wrap path.

* * * * *